US012028572B2

(12) United States Patent
Ayers et al.

(10) Patent No.: US 12,028,572 B2
(45) Date of Patent: **\*Jul. 2, 2024**

(54) CROSS-DEVICE INTERACTION

(71) Applicant: Digital Turbine, Inc., Austin, TX (US)

(72) Inventors: Brandon Brent Ayers, Austin, TX (US); Joel E. Frazier, Raleigh, NC (US); Harris David Thurmond, Austin, TX (US)

(73) Assignee: Digital Turbine, Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/087,855

(22) Filed: Dec. 23, 2022

(65) Prior Publication Data

US 2023/0128319 A1    Apr. 27, 2023

Related U.S. Application Data

(63) Continuation of application No. 17/088,777, filed on Nov. 4, 2020, now Pat. No. 11,540,007.

(51) Int. Cl.
*H04N 21/236* (2011.01)
*H04N 21/41* (2011.01)
(Continued)

(52) U.S. Cl.
CPC ... *H04N 21/43637* (2013.01); *H04N 21/4126* (2013.01); *H04W 4/80* (2018.02)

(58) Field of Classification Search
None
See application file for complete search history.

(56) References Cited

U.S. PATENT DOCUMENTS 10,311,480 B2  6/2019 Singh et al.
2009/0247114 A1* 10/2009 Sennett ............... H04W 76/50
                                                  455/404.1
(Continued)

FOREIGN PATENT DOCUMENTS

WO   WO 2015/047852   4/2015
WO   WO 2022/097006   5/2022

OTHER PUBLICATIONS

International Preliminary Report on Patentability May 19, 2023 From the International Bureau of WIPO Re. Application No. PCT IB2021/060091. (8 Pages).

(Continued)

*Primary Examiner* — Brian T Pendleton
*Assistant Examiner* — Jean D Saint Cyr

(57) ABSTRACT

A method, system and computer program product for cross-device interaction, the method comprising: intercepting a triggering event by a mobile client application program; employing a low energy communication monitoring service adapted for searching at least one universally unique identifier advertised by a low energy communication advertisement service configured to enable retrieval of a content identifier associated with content received from a server and being displayed by a television client application program, retrieving using the at least one universally unique identifier the content identifier, and providing the content identifier to the mobile client application program; and, responsive to receiving notice on intercepting a user interaction event by a user interaction event listener, presenting by the mobile client application program an information item retrieved using the content identifier provided.

20 Claims, 2 Drawing Sheets

Figure 1:
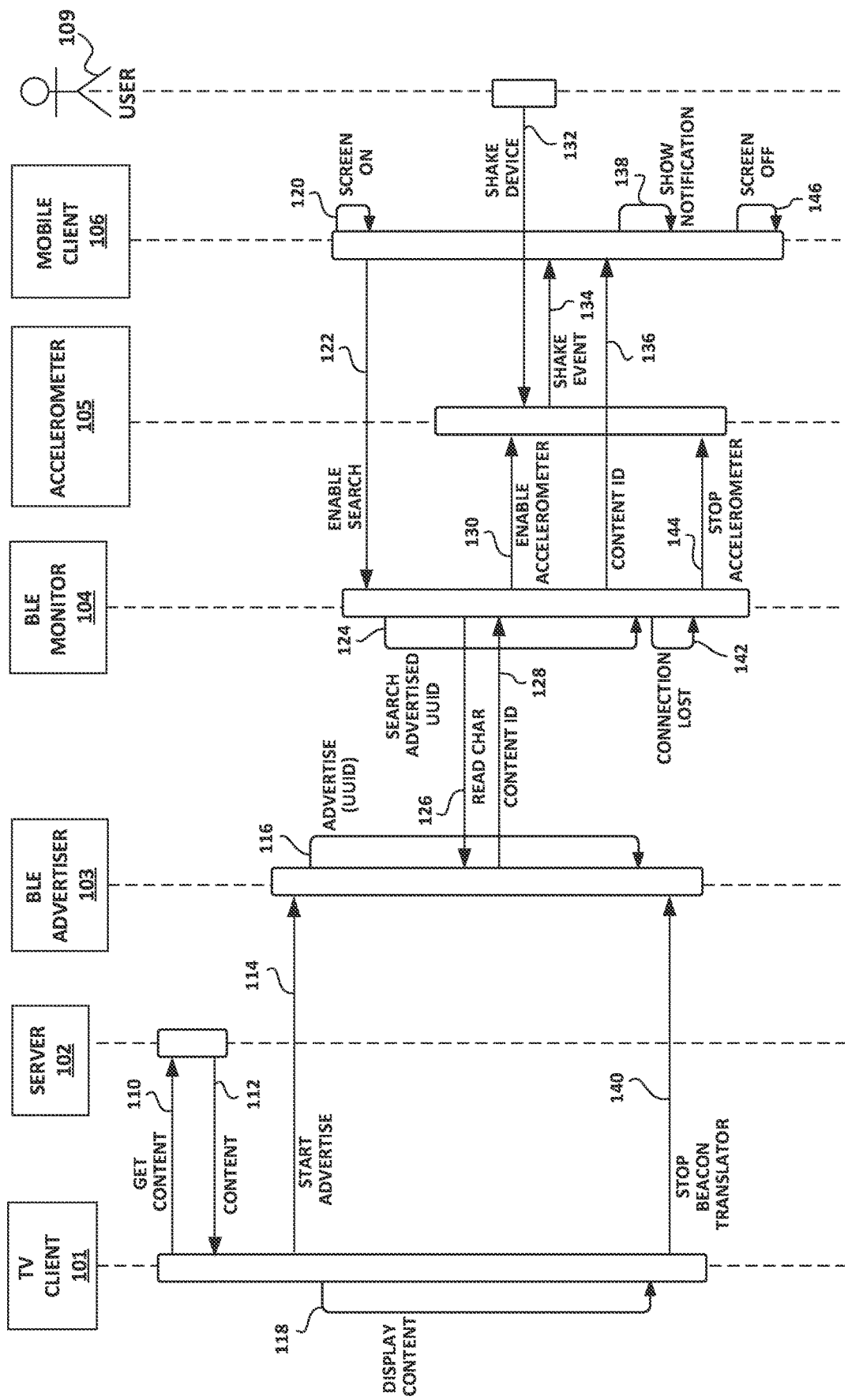

(51) Int. Cl.
  *H04N 21/426*   (2011.01)
  *H04N 21/43*    (2011.01)
  *H04N 21/4363*  (2011.01)
  *H04W 4/80*     (2018.01)

(56) References Cited

U.S. PATENT DOCUMENTS

| | | | |
|---|---|---|---|
| 2015/0058123 A1* | 2/2015 | Lenahan | G06Q 30/0255 |
| | | | 705/14.58 |
| 2015/0154642 A1 | 6/2015 | Dipaola | |
| 2015/0201306 A1 | 7/2015 | Kazemi et al. | |
| 2015/0248702 A1 | 9/2015 | Chatterton | |
| 2016/0183317 A1 | 6/2016 | Shao et al. | |
| 2016/0183318 A1 | 6/2016 | Luo | |
| 2016/0360382 A1 | 12/2016 | Gross et al. | |
| 2017/0272824 A1* | 9/2017 | Bunner | H04N 21/8586 |
| 2018/0182214 A1* | 6/2018 | Qi | H04W 12/06 |
| 2018/0205742 A1 | 7/2018 | Vinukonda et al. | |
| 2019/0357043 A1 | 11/2019 | Hu | |
| 2020/0236152 A1 | 7/2020 | Bradley et al. | |
| 2021/0195525 A1* | 6/2021 | Yoon | H04N 21/4436 |
| 2022/0141528 A1 | 5/2022 | Ayers et al. | |

OTHER PUBLICATIONS

Advisory Action Dated Jun. 2, 2022 from Re. U.S. Appl. No. 17/088,777. (3 pages).
Final Official Action Dated Mar. 9, 2022 from Re. U.S. Appl. No. 17/088,777. (16 pages).
International Search Report and the Written Opinion Dated Feb. 25, 2022 From the International Searching Authority Re. Application No. PCT/IB21/60091. (9 Pages).
Interview Summary Dated Jul. 27, 2022 from Re. U.S. Appl. No. 17/088,777. (3 pages).
Notice of Allowance Dated Sep. 8, 2022 from Re. U.S. Appl. No. 17/088,777. (11 pages).
Official Action Dated Aug. 23, 2021 from the Re. U.S. Appl. No. 17/088,777. (14 pages).

* cited by examiner

CROSS-DEVICE INTERACTION

RELATED APPLICATION

This application is a continuation of U.S. patent application Ser. No. 17/088,777 filed on Nov. 4, 2020.

The contents of the above application are all incorporated by reference as if fully set forth herein in their entirety.

FIELD AND BACKGROUND OF THE INVENTION

Some embodiments described in the present disclosure relate to wireless communication and, more specifically, but not exclusively, to cross-device interaction.

The advent of high throughput data communication networks and ever-growing ubiquity of computing devices spurred rapid evolution of the consumer electronics and digital multimedia content industries alike during recent years. One prominent trend is an ongoing rise in extent and frequency of widespread use of mobile devices equipped with general purpose processing capabilities, such as smartphones (i.e. mobile telephones running a full-fledged operating system platform) and tablet computers, which are able to communicate with other devices and/or device types over a variety of wired and/or wireless communication protocols. In addition, increasing shares of commercially available household appliances and electronic devices, such as televisions, refrigerators, air conditioners, speakers and the like, are being provided with network connectivity and computing resources of limited capacity at the least, to support some form of advanced functionality and/or enhanced user experience, e.g., remote operation and control, custom programming possibilities and/or the like, also known as "smart" devices. The afore-said technological and cultural developments are being reciprocated in turn by the emergence and proliferation of high-end services for supply of on-demand and/or online digital multimedia content being particularly suitable for home view, such as the digital content streaming services of Netflix™, Amazon Prime Video™, Apple TV+™ and the like.

SUMMARY OF THE INVENTION

It is an object of the present disclosure to describe a system and a method for cross-device interaction.

The foregoing and other objects are achieved by the features of the independent claims. Further implementation forms are apparent from the dependent claims, the description and the figures.

According to one aspect of some embodiments of the disclosed subject matter there is provided a method for cross-device interaction, the method comprising: intercepting a triggering event by a mobile client application program residing on a mobile device; employing a low energy communication monitoring service residing on the mobile device and adapted for: searching at least one universally unique identifier advertised by a low energy communication advertisement service residing on a television device, the at least one universally unique identifier being configured to enable retrieval of a content identifier associated with content received from a server and being displayed on the television device by a television client application program residing on the television device; retrieving, using the at least one universally unique identifier, the content identifier; and providing the content identifier to the mobile client application program; and, responsive to receiving notice on intercepting a user interaction event by a user interaction event listener enabled on the mobile device, presenting by the mobile client application program to a user of the mobile device an information item retrieved using the content identifier provided.

Optionally, the method further comprising: responsive to the low energy communication monitoring service retrieving the content identifier, enabling the user interaction event listener for intercepting the user interaction event.

More optionally, enabling the user interaction event listener being performed by the mobile client application program in case of the mobile device and the television device being interconnected, and by the low energy communication monitoring service otherwise.

Optionally, the user interaction event being a shake of the mobile device performed by a user, wherein the user interaction event listener being an accelerometer of the mobile device.

Optionally, in case of the mobile device and the television device not being interconnected, the triggering event being determining that a display screen of the mobile device being turned on.

Optionally, in case of the mobile device and the television device being interconnected, the triggering event being receiving from the server information to be used for the encoding of a push notification sent to the server by the television client application program responsive to receiving from the server content and displaying thereof on the television device.

Optionally, the low energy communication monitoring service and the low energy communication advertisement service being Bluetooth low energy services.

Optionally, the method further comprising disabling on the mobile device the user interaction event listener by the low energy communication monitoring service responsive to intercepting thereby a terminating event.

More optionally, in case of the mobile device and the television device not being interconnected, the terminating event being termination of beacon transmission by the low energy communication advertisement service.

More optionally, in case of the mobile device and the television device being interconnected, the terminating event being disablement of the at least one universally unique identifier advertising by the low energy communication advertisement service.

More optionally, the terminating event being generated by the television client application program responsive to terminating display of the content on the television device.

According to another aspect of some embodiments of the disclosed subject matter there is provided a method for cross-device interaction, the method comprising: requesting, by a television client application program residing on a television device, receipt of content from a server; and responsive to receiving from the server the content and displaying thereof on the television device, employing a low energy communication advertisement service residing on a television device and adapted for: advertising at least one universally unique identifier configured to enable retrieval of a content identifier associated with content displayed on the television device; whereby a low energy communication monitoring service residing on a mobile device being able to retrieve, using the at least one universally unique identifier, the content identifier and provide the content identifier to a mobile client application program residing on the mobile device, whereby the mobile client application program being able to present to a user of the mobile device responsive to receiving notice on intercepting by a user interaction event listener a user interaction event, an information item retrieved using the content identifier provided.

Optionally, the method further comprising in case of the mobile device and the television device being interconnected, sending by the television client application program to the server responsive to receiving therefrom and displaying the content on the television device, information to be used for the encoding of a push notification using a token of the mobile device for relay to the mobile device by the server.

Optionally, the method further comprising responsive to displaying the content on the television device being terminated, disabling advertisement of the at least one universally unique identifier by the low energy communication advertisement service in case of the mobile device and the television device being interconnected.

Optionally, the method further comprising responsive to displaying the content on the television device being terminated, terminating beacon transmission by the low energy communication advertisement service in case of the mobile device and the television device not being interconnected.

According to yet another aspect of some embodiments of the disclosed subject matter there is provided a computer program product for cross-device interaction, comprising: a non-transitory computer readable storage medium; program instructions for executing, by a processor, a method for cross-device interaction, the method comprising: intercepting a triggering event by a mobile client application program residing on a mobile device; employing a low energy communication monitoring service residing on the mobile device and adapted for: searching at least one universally unique identifier advertised by a low energy communication advertisement service residing on a television device, the at least one universally unique identifier being configured to enable retrieval of a content identifier associated with content received from a server and being displayed on the television device by a television client application program residing on the television device; retrieving, using the at least one universally unique identifier, the content identifier; and providing the content identifier to the mobile client application program; and, responsive to receiving notice on intercepting a user interaction event by a user interaction event listener enabled on the mobile device, presenting by the mobile client application program to a user of the mobile device an information item retrieved using the content identifier provided.

According to yet another aspect of some embodiments of the disclosed subject matter there is provided a computer program product for cross-device interaction, comprising: a non-transitory computer readable storage medium; program instructions for executing, by a processor, a method for cross-device interaction, the method comprising: requesting, by a television client application program residing on a television device, receipt of content from a server; and responsive to receiving from the server the content and displaying thereof on the television device, employing a low energy communication advertisement service residing on a television device and adapted for: advertising at least one universally unique identifier configured to enable retrieval of a content identifier associated with content displayed on the television device; whereby a low energy communication monitoring service residing on a mobile device being able to retrieve, using the at least one universally unique identifier, the content identifier and provide the content identifier to a mobile client application program residing on the mobile device, whereby the mobile client application program being able to present to a user of the mobile device responsive to receiving notice on intercepting by a user interaction event listener a user interaction event, an information item retrieved using the content identifier provided.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

Unless otherwise defined, all technical and/or scientific terms used herein have the same meaning as commonly understood by one of ordinary skill in the art to which embodiments. Although methods and materials similar or equivalent to those described herein can be used in the practice or testing of embodiments, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWING(S)

Some embodiments are herein described, by way of example only, with reference to the accompanying drawings. With specific reference now to the drawings in detail, it is stressed that the particulars shown are by way of example and for purposes of illustrative discussion of embodiments. In this regard, the description taken with the drawings makes apparent to those skilled in the art how embodiments may be practiced.

Figure 2:
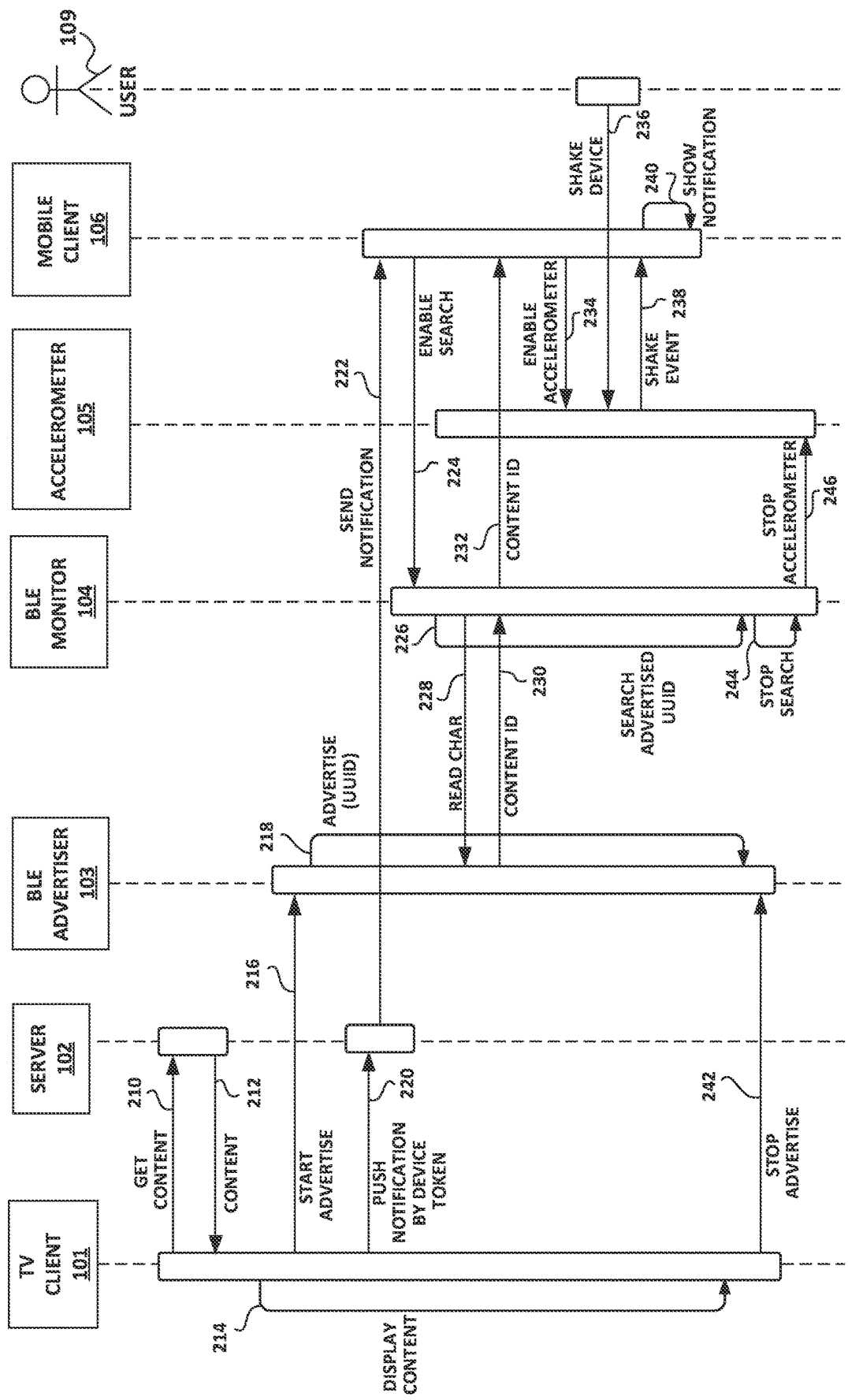

In the drawings:

FIG. 1 is a sequence diagram of an optional flow of operations for cross-device interaction of non-interconnected devices, according to some embodiments; and FIG. 2 is a sequence diagram of an optional flow of operations for cross-device interaction of interconnected devices, according to some embodiments.

DETAILED DESCRIPTION

Some embodiments described in the present disclosure relate to a wireless communication and, more specifically, but not exclusively, to a cross-device interaction.

Providers of digital content platforms and/or services and users thereof are constantly on the lookout for qualities and functionalities that contribute added value to the content consumption experience. Thus, suppliers and vendors may be interested in dynamic and wide-reaching ways to engage with their audiences, on the one hand, whereas viewers may opt for enrichment and/or enhancement of their own user experience as well as enjoying customization and personalization capabilities and choices.

One technical problem dealt with by the disclosed subject matter is to enable cross-device interaction for a user of a mobile device, such as a smartphone or a tablet computer, in conjunction with digital content service or platform usage thereby.

Another technical problem dealt with by the disclosed subject matter is to provide a proximity-based experience of cross-device interaction over a television device and a mobile device.

Yet another technical problem dealt with by the disclosed subject matter is to allow exchange of content between a television device and a mobile device while conserving resources of the mobile device such as energy and/or bandwidth.

In some exemplary embodiments, a television device may comprise and/or be coupled to one or more processor(s) for executing code instructions stored in system memory (also referred to as program store) also comprised in the television device and/or being in communication therewith. Optionally the television device may be provided with an operating system installed thereon and being capable of running one or more application programs residing in system memory. For example, the television device may be an Android™ device and/or configured to run an Android™ operating system commercially available from and sponsored by the Open Handset Alliance developers consortium and Google.

The television device may comprise a network interface configured to transmit and receive data over a communication channel and/or network, such as for example the Internet. The network interface may support networking protocols, for example Transmission Control Protocol and Internet Protocol (TCP/IP), Asynchronous Transfer Mode (ATM), asymmetric digital subscriber line (ADSL), and/or any other networking protocol. Additionally or alternatively, the network interface may use one or more wireless protocols, including Bluetooth, Bluetooth low energy (BLE), 802.11 compliant wireless local area network (WLAN), and/or any other wireless protocol.

The television device may be provided with a television client application program residing in system memory and being configured for reproducing and displaying digital content on a display screen of the television device. The television client application program may be in communication with a server and configured to retrieve content therefrom, for example in response to a user command input from a user interacting with the television client application program or per pre-programmed instructions retained or incorporated therein, for example by means of a Software Development Kit (SDK) or the like. The server may be adapted for distributing content over a communication network, such as a Content Distribution Network (CDN) server or the like.

In some exemplary embodiments, the television device may be provided with a low energy communication advertisement service. The term "advertisement" as used herein refers to a transmission or broadcast by a device to either indicate certain information or request connection to one or more other devices. The low energy communication advertisement service may employ a low energy wireless communication protocol, such as for example, Bluetooth Low Energy (BLE), Digital Enhanced Cordless Telecommunications Ultra Low Energy (DECT ULE), or any other low energy wireless communication protocol. The low energy communication advertisement service may reside in memory of the television device. Optionally the low energy communication advertisement service may be integrated into or supported by built-in platform functionality of an operating system residing in the television device, for example, Bluetooth Low Energy Application Programming Interface (BLE API) introduced in Android 4.3 (API level 18).

A user of the television device may be using or have in their possession a mobile device having processor(s) and memory, for example, a smartphone, a tablet, a smartwatch, and/or any other mobile device. The mobile device may comprise a network interface for transmitting and receiving data using the same network and/or wireless protocols supported by the television device. The mobile device may be provided with a mobile client application program residing therein, either natively e.g., as a bundle software of an operating system, or voluntarily installed thereon by the user. The mobile client application program may be configured to support user interaction with content displayed by the television device, via a low energy communication monitoring service residing in the mobile device. The low energy communication monitoring service may be configured for scanning and discovery of advertisement(s) by device(s) at a predetermined range from the mobile device. For example, when a user of the mobile device is in the same room where the television device is located, the distance there-among may be in operational range at which the low energy communication monitoring service residing in the mobile device may be employed for discovering advertising transmissions made by the low energy communication advertisement service residing in the television device. Optionally the low energy communication monitoring service may be integral to and/or supported by an operating system of the mobile device, such as Android BLE or the like.

In some exemplary embodiments, the mobile client application program may be configured to initiate interaction in response to user action performed on the mobile device. Optionally the low energy communication monitoring service residing in the mobile device or the mobile client application program may set up a user interaction event listener on the mobile device for intercepting the user action in due course and indicating to the mobile client application program that the user performed the action. The user interaction event listener and the user action may be, for example, an accelerometer of the mobile device and a shaking of the mobile device by a user, respectively. Alternatively or additionally, other user action(s) and/or user interaction event listener(s) of similar or different type(s) may be used, for example, a user interaction with a touchscreen of the mobile device, a voice activation command received via a microphone of the mobile device, or the like. Optionally the low energy communication monitoring service may be configured to monitor advertising activity of the low energy advertisement service and detect whether advertisements thereby stopped or no longer being received, in which case the low energy communication monitoring service may disable the user interaction event listener.

In some exemplary embodiments a content map may be used to enumerate a plurality of content items available from the server and refer to each and/or any particular content item of the plurality by a content identifier assigned thereto. The content identifier may serve as a key to the content map for retrieval of a value entry associated with the respective content item. The value entry may be an information item for presentation to the user of the mobile device, optionally in conjunction or relation to display of the content item by the television device. The information item may be presented by the mobile client application program in response to receiving an indication from the user interaction event listener that the user performed a predetermined action. The information item may comprise information conveyed in any humanly perceivable form, for example: visually such as text, graphics, images, and/or the like; aurally such as speech, sounds, voice, music, and/or the like; tactually such as vibration and/or the like; and/or any combination thereof. Optionally the information item itself may be another content item, for example the content item displayed on the television device may be a cooking competition show and the information item may be an advertisement for a discount offer on a cooking class.

In some exemplary embodiments each content identifier may be encoded by or translated into a universally unique identifier (UUID). UUIDs may be sequences of alphanumeric characters of a fixed length generated under a defined protocol, such that for all practical purposes, a likelihood of duplication thereof may be considered negligible. In the context of low energy communication protocols, such as Bluetooth low energy (BLE), UUIDs may be used for identifying attributes exhibited by a low energy communicating device, such as services supported thereby, characteristics of a given service, descriptors of a given characteristic, and/or the like. As used herein, the term "service" may be understood as referring to a collection of related characteristics, which operate together to perform a particular function, whereas the term "characteristic" may refer to a data value transferred between one low energy communicating device to another, and the term "descriptor" may refer to additional information about a characteristic. For example, a health thermometer service may include characteristics for a temperature measurement value and a time interval between measurements, and a descriptor of the temperature value characteristic may have an indication of its units (e.g. Celsius) and a range of values that may be measured by a temperature sensor. In the context of the disclosed subject matter, a content identifier may be a characteristic of the low energy communication advertisement service. The content identifier may be extracted from or retrieved by an advertised UUID using an attribute read operation, for example, in Android BLE a call to a function such as onCharacteristicRead( ) or the like may be invoked on the UUID and the content identifier may be provided as a return value of the function.

In some exemplary embodiments the television device and the mobile device may be interconnected as result of a pairing or connection operation therebetween, for example, using a service discovery protocol (SDP) and/or a service discovery platform such as Bluetooth SDP, Nearby by Google, network service discovery (NSD) by Google, and/or the like. Optionally in case of the television device and the mobile device being interconnected, the television client application program may send to the server information to be used for the encoding of a push notification using a token of the mobile device. The token may be a secret information shared by the television device and the mobile device. The token may be generated ad hoc in response to establishment of an interconnection between the television device and the mobile device or once during an initial registration of the television device by the mobile device. The server may then relay the notification to the mobile device to initiate interaction between the two devices. In response to receiving the notification from the server, the mobile client application program may employ the low energy communication monitoring service to start a scan and discovery process in search of advertised UUIDs, and set up and/or enable a user interaction event listener for intercepting a user action, as described herein. Optionally in case of the television device and the mobile device being interconnected, the user interaction event listener may be enabled by the mobile client application program in response to retrieval of a content identifier by the low energy communication monitoring service using a UUID received thereby from the low energy communication advertisement service. Otherwise the user interaction event listener may be enabled by the low energy communication monitoring service in response to retrieval of the content identifier thereby. Additionally or alternatively, in case of the television device and the mobile device not being interconnected, instead of a push notification relayed by the server, the mobile client application program may initiate a search for advertised UUIDs in response to any other predetermined triggering event being detected. Optionally in case of the television device and the mobile device not being interconnected, the triggering event may be a determination by the mobile client application program that a display screen of the mobile device is being turned on.

Before explaining at least one embodiment in detail, it is to be understood that embodiments are not necessarily limited in its application to the details of construction and the arrangement of the components and/or methods set forth in the following description and/or illustrated in the drawings and/or the Examples. Implementations described herein are capable of other embodiments or of being practiced or carried out in various ways.

Embodiments may be a system, a method, and/or a computer program product. The computer program product may include a computer readable storage medium (or media) having computer readable program instructions thereon for causing a processor to carry out aspects of the embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of embodiments.

Aspects of embodiments are described herein with reference to flowchart illustrations and/or block diagrams of methods, apparatus (systems), and computer program products according to embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference is now made to FIG. 1, which is a sequence diagram of an optional flow of operations for cross-device interaction of non-interconnected devices, according to some embodiments.

A television client application program, denoted in FIG. 1 as TV client 101, may reside in a television device (not shown) and communicate with a server 102. A Bluetooth low energy (BLE) advertiser 103, and/or any other likewise low energy communication advertisement service, may also reside in the television device. Similarly, a BLE monitor 104, and/or any other likewise low energy communication monitoring service, and a mobile client application program, denoted in FIG. 1 as mobile client 106, may reside in a mobile device (not shown) of a user 109. The mobile device may comprise an accelerometer 105 and/or any likewise mechanism for sensing interaction of user 109 with the mobile device.

As shown in FIG. 1, at 110, TV client 101 may issue a request to get content from server 102. At 112, server 102 may send content to TV client 101. At 114, TV client 101 may give instruction to BLE advertiser 103 to advertise a content identifier of the content received from server 102. At 116, BLE advertiser 103 may advertise a universally unique identifier (UUID) corresponding to the content identifier. At 118, TV client 101 may display the content on the television device.

Meanwhile, at 120, mobile client 106 may detect status of a display screen of the mobile device and determine that the display screen being turned on. At 122, mobile client 106 may enable and/or instruct BLE monitor 104 to search for advertised UUIDs. At 124, BLE monitor 104 may search for advertised UUIDs. At 126, BLE monitor 104 may perform on a UUID advertised by BLE advertiser 103 an operation of reading characteristic thereof. At 128, BLE monitor 104 may obtain the content identifier as result of the read of characteristic of the UUID advertised by BLE advertiser 103.

At 130, in response to retrieval of the content identifier, BLE monitor 104 may enable accelerometer 105. At 132, user 109 may shake the mobile device. At 134, accelerometer 105 may fire a shake event in indication to mobile client 106 of user 109 shaking the mobile device. At 136, the content identifier may be obtained by mobile client 106 from BLE monitor 104. At 138, mobile client 106 may present on the mobile device to user 109 an information item retrieved using the content identifier, for example, show notification related to the content displayed on the television device, and/or the like.

At 140, optionally in response to termination of displaying the content, TV client 101 may terminate advertisement of a UUID comprising the content identifier, for example, by stopping beacon translator of BLE advertiser 103 from transmitting beacon signals. At 142, BLE monitor 104 may detect loss of connection with BLE advertiser 103. At 144, in response to detecting that the connection with BLE advertiser 103 being lost, BLE monitor 104 may stop accelerometer 105 from tracking interaction with the mobile device by user 109. At 146, mobile client 106 may turn off the screen of the mobile device.

Reference is now made to FIG. 2, which is a sequence diagram of an optional flow of operations for cross-device interaction of interconnected devices, according to some embodiments.

In FIG. 2, TV client 101, server 102, BLE advertiser 103, BLE monitor 104, accelerometer 105, mobile client 106 and user 109 may be same as discussed herein with reference to FIG. 1 or similar thereto for all intended purposes. However, unlike in FIG. 1, where no prior engagement between the television device and the mobile device is assumed, the flow depicted in FIG. 2 is predicated on premise that the television device and the mobile device are paired and/or connected via a network discovery service or platform.

As shown in FIG. 2, at 210, TV client 101 may request to get content from server 102, similarly as in 110 in FIG. 1. At 212, server 102 may send content to TV client 101, similarly as in 112 in FIG. 1. At 214, TV client 101 may display the content on the television device, similarly as in 118 in FIG. 1. At 216, TV client 101 may instruct BLE advertiser 103 to advertise a content identifier of the content received from server 102, similarly as in 114 in FIG. 1. At 218, BLE advertiser 103 may advertise a universally unique identifier (UUID) corresponding to the content identifier, similarly as in 116 in FIG. 1.

Further as shown in FIG. 2, at 220, TV client 101 may send to server 102 information to be used for the encoding of a push notification using a device token of the mobile device. At 222, server 102 may send or relay the push notification to mobile client 106. At 224, in response to the notification sent from server 102, mobile client 106 may enable search by BLE monitor 104 for advertised UUIDs, similarly as in 122 in FIG. 1. At 226, BLE monitor 104 may search for UUIDs advertised by BLE advertiser 103, similarly as in 124 in FIG. 1. At 228, BLE monitor 104 may read characteristic of the advertised UUID, similarly as in 126 in FIG. 1. At 230, BLE monitor 104 may obtain the content identifier, similarly as in 128 in FIG. 1.

At 232, mobile client 106 may receive the content identifier as obtained by BLE monitor 104 in 230. At 234, mobile client 106 may enable accelerometer 105 for intercepting interaction by user 109 with the mobile device. At 236, user 109 may shake the mobile device, similarly as in 132 in FIG. 1. At 238, accelerometer 105 may fire a shake event in indication to mobile client 106 of user 109 shaking the mobile device, similarly as in 134 in FIG. 1. At 240, mobile client 106 may present on the mobile device to user 109 information retrieved using the content identifier, e.g. show notification, similarly as in 138 in FIG. 1.

At 242, upon termination of displaying the content, TV client 101 may stop and/or disable advertisement of the UUID comprising the content identifier by BLE advertiser 103, for example, by shutting down BLE advertiser 103. At 244, BLE monitor 104 may stop searching for advertised UUIDs. At 246, BLE monitor 104 may stop and/or disable accelerometer 105, similarly as in 144 in FIG. 1.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant cross-device interaction systems and/or methods will be developed and the scope of the term cross-device interaction is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment may include a plurality of "optional" features unless such features conflict.

Throughout this application, various embodiments may be presented in a range format. It should be understood that the description in range format is merely for convenience and brevity and should not be construed as an inflexible limitation on the scope of embodiments. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of embodiments, which are, for clarity, described in the context of separate embodiments, may also be provided in combination in a single embodiment. Conversely, various features of embodiments, which are, for brevity, described in the context of a single embodiment, may also be provided separately or in any suitable subcombination or as suitable in any other described embodiment. Certain features described in the context of various embodiments are not to be considered essential features of those embodiments, unless the embodiment is inoperative without those elements.

Although embodiments have been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A method for cross-device interaction, the method comprising:
    employing, by a mobile client application program residing on a mobile device, in order of initiating an interaction with content served by a device adapted for serving content, a low energy communication monitoring service residing on the mobile device and adapted for:
        searching at least one universally unique identifier advertised through low energy communication transmission transmitted by a low energy communication advertisement service residing on the device serving the content and adapted for transmitting beacon signals and information indication discoverable by other devices without requiring a pre-existing connection between the device serving the content and the other devices, said at least one universally unique identifier (UUID) comprising a sequence of alphanumeric characters of a fixed length generated under a defined UUID generation protocol and being configured to enable the low energy communication monitoring service retrieval of a content identifier associated with the content concurrently being served by the device;
        retrieving, using said at least one universally unique identifier, the content identifier by utilizing an application programming interface of low energy communication, wherein utilizing the application programming interface comprising invoking a function call of the low energy communication advertisement service; and
        providing the content identifier to the mobile client application program; and,
    responsive to the mobile client application program receiving notice on the mobile device intercepting a user interaction event by a user interaction event listener enabled on the mobile device, presenting by the mobile client application program to a user of the mobile device an information item retrieved using the content identifier provided.

2. The method of claim 1, further comprising:
    responsive to said low energy communication monitoring service retrieving the content identifier, enabling the user interaction event listener for intercepting the user interaction event.

3. The method of claim 2, wherein enabling the user interaction event listener being performed by said mobile client application program in case of the mobile device and the device serving the content being interconnected, and by said low energy communication monitoring service otherwise.

4. The method of claim 1, wherein the user interaction event being a shake of the mobile device performed by a user, wherein the user interaction event listener being an accelerometer of the mobile device.

5. The method of claim 1, further comprising intercepting a triggering event by the mobile client application program residing on the mobile device, wherein the employing the low energy communication monitoring service in order of initiating the interaction is in response to said intercepted triggering event.

6. The method of claim 5, wherein in case of the mobile device and the device serving the content being interconnected, the triggering event being receiving from a server a push notification, wherein information to be used for encoding of the push notification being sent to the server by a client application program residing on the device serving the content responsive to receiving from the server the content and serving thereof by the device.

7. The method of claim 1, wherein said low energy communication monitoring service and said low energy communication advertisement service being Bluetooth low energy services.

8. The method of claim 1, further comprising:
    disabling on the mobile device the user interaction event listener by said low energy communication monitoring service responsive to intercepting thereby a terminating event.

9. The method of claim 8, wherein in case of the mobile device and the device serving the content not being interconnected, the terminating event being termination of beacon transmission by said low energy communication advertisement service.

10. The method of claim 8, wherein in case of the mobile device and the device serving the content being interconnected, the terminating event being disablement of said at least one universally unique identifier advertising by said low energy communication advertisement service.

11. The method of claim 8, wherein the terminating event being generated by a client application program residing on the device serving the content responsive to terminating serving of the content by the device.

12. A method for cross-device interaction, the method comprising:
    employing, by a client application program residing on a device adapted for serving content, in order of initiating an interaction of a mobile client application program residing on a mobile device with content served by the device, a low energy communication advertisement service residing on the device serving the content and adapted for transmitting beacon signals and information indication discoverable by other devices without requiring a pre-existing connection between the device serving the content and the other devices, wherein the low energy communication advertisement service is further adapted for performing:
        concurrently with said serving of said content on said device, advertising at least one universally unique identifier through low energy communication transmission, said at least one universally unique identifier (UUID) comprising a sequence of alphanumeric characters of a fixed length generated under a defined UUID generation protocol and being configured to enable a low energy communication monitoring service residing on the mobile device retrieval of a content identifier associated with said content concurrently being served by the device;
    wherein the low energy communication monitoring service residing on the mobile device being configured to retrieve, using said at least one universally unique identifier, the content identifier by utilizing an application programming interface of low energy communication and provide the content identifier to the mobile client application program residing on the mobile device, wherein utilizing the application programming interface comprising invoking a function call of the low energy communication advertisement service, wherein the mobile client application program being configured to present to a user of the mobile device responsive to the mobile client application program receiving notice on the mobile device intercepting by a user interaction event listener enabled on the mobile device a user interaction event, an information item retrieved using the content identifier provided.

13. The method of claim 12, further comprising in case of the mobile device and the device serving the content being interconnected, sending by the client application program residing on the device to a server information to be used for encoding of a push notification for relay to the mobile device by the server.

14. The method of claim 12, further comprising responsive to serving the content on the device being terminated, disabling advertisement of said at least one universally unique identifier by the low energy communication advertisement service in case of the mobile device and the device serving the content being interconnected.

15. The method of claim 12, further comprising responsive to serving the content on the device being terminated, terminating beacon transmission by the low energy communication advertisement service in case of the mobile device and the device serving the content not being interconnected.

16. A computer program product for cross-device interaction, comprising:
  a non-transitory computer readable storage medium;
  program instructions for executing, by a processor, the method of claim 1.

17. A computer program product for cross-device interaction, comprising:
  a non-transitory computer readable storage medium;
  program instructions for executing, by a processor, the method of claim 12.

18. The method of claim 5, wherein in case of the mobile device and the device serving the content not being interconnected, the triggering event being determining that a display screen of the mobile device being turned on.

19. The method of claim 12, further comprising requesting, by the client application program residing on the device adapted for serving content, receipt of content from a server, wherein the employing the low energy communication advertisement service in order of initiating the interaction is in response to the client application program receiving from the server the content and serving thereof by the device.

20. The method of claim 1, wherein said low energy communication monitoring service is further adapted for scanning and discovery of advertisements by devices at a predetermined range from the mobile device.

* * * * *